US009701880B2

(12) United States Patent
Magela De Lima et al.

(10) Patent No.: US 9,701,880 B2
(45) Date of Patent: Jul. 11, 2017

(54) PROCESS FOR PREPARING ABSORBENT MATERIAL FOR APOLAR COMPOUNDS OR MIXTURES

(71) Applicants: UNIVERSIDADE FEDERAL DE MINAS GERAIS, Belo Horizonte (BR); AS ENGENHARIA E CONSULTORIA LTDA., Belo Horizonte (BR)

(72) Inventors: Geraldo Magela De Lima, Belo Horizonte (BR); Jadson Cláudio Belchior, Belo Horizonte (BR); Daniele Santos Cavanellas Gomes, Belo Horizonte (BR); Fabrício Vieira De Andrade, Belo Horizonte (BR); Geison Voga Pereira, Belo Horizonte (BR); Márcio Guimarães Coelho, Belo Horizonte (BR); Nathália Gabriela Silva Pinheiro, Belo Horizonte (BR); Flávia Cristina Camilo Moura, Belo Horizonte (BR); Maria Helena De Araujo, Belo Horizonte (BR)

(73) Assignees: UNIVERSIDADE FEDERAL DE MINAS GERAIS-UFMG, Belo Horizonte (BR); AS ENGENHARIA E CONSULTORIA LTDA., Belo Horizonte (BR)

( * ) Notice: Subject to any disclaimer, the term of this patent is extended or adjusted under 35 U.S.C. 154(b) by 655 days.

(21) Appl. No.: 13/904,527

(22) Filed: May 29, 2013

(65) Prior Publication Data

US 2014/0141969 A1  May 22, 2014

Related U.S. Application Data

(63) Continuation-in-part of application No. 13/810,203, filed as application No. PCT/BR2011/000236 on Jul. 14, 2011.

(30) Foreign Application Priority Data

Jul. 14, 2010 (BR) .................................. 1005885-0
Jul. 14, 2011 (BR) ........................... 014110002210

(51) Int. Cl.
  *B01J 20/26* (2006.01)
  *B01J 20/32* (2006.01)
  (Continued)

(52) U.S. Cl.
  CPC .............. *C09K 3/32* (2013.01); *B01J 20/261* (2013.01); *B01J 20/262* (2013.01);
  (Continued)

(58) Field of Classification Search
  None
  See application file for complete search history.

(56) References Cited

U.S. PATENT DOCUMENTS

| 1,690,680 A | 11/1928 | Hirsh |
| 1,892,105 A | 12/1932 | Huskey |

(Continued)

FOREIGN PATENT DOCUMENTS

| BR | PI0201685 | 3/2004 |
| BR | PI0701585 | 11/2008 |
| WO | 2006/017919 | 2/2006 |

OTHER PUBLICATIONS

Office Action for U.S. Appl. No. 13/810,203, all pages, mailed Dec. 3, 2015.

(Continued)

Primary Examiner — Joseph D Anthony
(74) Attorney, Agent, or Firm — Nixon & Vanderhye PC

(57) ABSTRACT

The present invention discloses a method for preparing and using an absorbent material for apolar compounds or mixtures of apolar compounds, such as organic solvents, mineral (Continued)

oil and derivatives thereof, lubricant oils, edible oils, inter alia. The absorbent material is composed of an fabric matrix of high porosity, low density and high mechanical resistance. This matrix is rendered water-proof, thus acquiring the property of absorbing apolar compounds or mixtures of apolar compounds.

6 Claims, 5 Drawing Sheets

(51) Int. Cl.
    *B01J 20/34*      (2006.01)
    *C02F 1/28*      (2006.01)
    *B09C 1/08*      (2006.01)
    *C09K 3/32*      (2006.01)
    *C02F 1/68*      (2006.01)
    *B01J 20/28*      (2006.01)
    *B01J 20/30*      (2006.01)
    *C02F 101/32*      (2006.01)
    *C02F 101/34*      (2006.01)
    *C02F 103/00*      (2006.01)
    *C02F 103/06*      (2006.01)
(52) U.S. Cl.
    CPC ..... *B01J 20/28033* (2013.01); *B01J 20/3078* (2013.01); *B01J 20/3206* (2013.01); *B01J 20/327* (2013.01); *B01J 20/3272* (2013.01); *B01J 20/3276* (2013.01); *B09C 1/08* (2013.01); *C02F 1/288* (2013.01); *C02F 1/681* (2013.01); *C02F 1/285* (2013.01); *C02F 2101/32* (2013.01); *C02F 2101/322* (2013.01); *C02F 2101/325* (2013.01); *C02F 2101/345* (2013.01); *C02F 2103/007* (2013.01); *C02F 2103/06* (2013.01)

(56) References Cited

U.S. PATENT DOCUMENTS

| | | | |
|---|---|---|---|
| 2,367,384 A | | 1/1945 | Tymstra et al. |
| 2,801,190 A | * | 7/1957 | Reuter ................... A45B 19/04 |
| | | | 106/268 |
| 2,956,903 A | * | 10/1960 | Spencer ................ D06M 15/39 |
| | | | 427/389.9 |
| 3,382,170 A | | 5/1968 | Pape et al. |
| 3,408,299 A | | 10/1968 | Henry |
| 3,535,195 A | * | 10/1970 | Loew ..................... B29C 70/58 |
| | | | 112/417 |
| 5,035,804 A | | 7/1991 | Stowe |
| 2006/0033229 A1 | | 2/2006 | Daley |
| 2013/0153506 A1 | | 6/2013 | Duggirala |

OTHER PUBLICATIONS

International Search Report for PCT/BR2011/000236, three pages (Jan. 2012).
International Preliminary Report on Patentability for PCT/BR2011/000236, nine pages (Jan. 2012).
Teas et al. "Investigation of the effectiveness of absorbent materials in oil spills clean up" *Desalination*, vol. 140, No. 3, pp. 259-264 (Nov. 2001).

* cited by examiner

PROCESS FOR PREPARING ABSORBENT MATERIAL FOR APOLAR COMPOUNDS OR MIXTURES

This application is a Continuation-In-Part of application Ser. No. 13/810,203, filed Jan. 14, 2013, now pending; which is the U.S. national stage of Application No. PCT/BR2011/000236, filed Jul. 14, 2011; the entire contents of each of which are hereby incorporated by reference.

This patent application refers to absorbent material for apolar compounds or mixtures of apolar compounds such as organic solvents, petroleum (oil), lubricating oils, edible oils, The absorbent material is composed by a porous matrix in the from of flexible fabric, preferably nonwoven fabric—TNT, of high porosity, low density and high mechanical resistance, impregnated with a hydrophobizing agent consisting of silicone, polystyrene, polyethylene terephthalate (PET), polyethylene or polypropylene. The support TNT matrix may be replaced by type flannel fabrics, polyester and elastane (spandex) fabric or mixtures of these types of fabric. This matrix when hydrophobized acquires the absorption capacity of apolar compounds or mixtures of apolar compounds for selection. The use of this material enables the construction of filters selective for apolar compounds with high efficiency. The use of flexible material for the production of filters is a great improvement over that described in patent application PI1103680-8.

Patent application PI1103680-8, titled "Process of preparation, the application and recovery of absorbent material for compounds or mixtures of nonpolar" describes the preparation, use and recovery of a material composed of a inorganic matrix of autoclaved cellular concrete hydrophobized with silicone or polystyrene, as well as the production of filters for absorbing apolar compounds using the same material as mentioned above.

The technology allows the absorption of apolar compounds such as phenol, toluene, benzene, hexane, cyclohexane, petroleum spills, and the recovery there of that can be accomplished by solvent extraction or by using the cracking system.

The use of apolar compounds in the chemical industries generates much waste of organic solvents and also a high frequency of environmental accidents caused by spilling of these compounds in natural aquifers, such as oceans, seas, rivers, mangroves, lakes and lagoons, as well as the contamination of the soil at the river banks and beaches, damaging the whole aquatic and land fauna and flora. Such environmental accidents also prejudice several economic and industrial sectors, such as fishing, farming, water treatment systems, among others.

Thus, in order to minimize the costs for revitalizing the areas degraded by oil spilling or for revitalizing rivers, lakes, lagoons contaminated by similar compounds, several measures for preventing damages to the environment have been implemented, such as the construction of more resistant oil pipelines, implementation of systems for treating industrial wastes, among others.

The prior art describes some materials that may be of apolar compounds, as for example, patent BR9103357 (A process for obtaining granulated or powdered rubber with a wide range of oil absorption, derivatives thereof and other solvents, 1991), which describes the application of vulcanized rubber in the form of powder or granules for absorbing oils and derivatives thereof.

Another example of absorption of apolar compounds is described in patent application BR0702220 (A process of producing a recyclable web for absorbing petroleum, 2007), which describes the use of TNT fabric composed by pressed viscose and polyester, then the material should be dipped into a bath containing bactericide, fungicide and oil for storing the product. In the description of the technology, one finds the drawback of using biocidal compounds that may cause contamination of the aquatic environment with bactericidal and fungicidal agents during the process of removing, for example, spilt oil, which may further aggravate the environmental damages.

For the use of inorganic matrix to absorb apolar compounds, one finds patent application BR0701585 (A process for obtaining low-density porous ceramics with controlled closed and open porosity, 2008), which describes the preparation of a mixture composed of clay, maize and cassava starch, EPS wax and bentonite as a binding agent. This mixture is homogenized and heated until the starch is burned, forming open pores for the absorption of petroleum and closed pores for the material to float in an aqueous medium. However, the mechanical resistance of the composite formed impairs the reuse thereof. In order to enhance the mechanical resistance, one can use more bentonite, but the number of closed pores, that is, inaccessible to the absorbed compound, is drastically increased, thus reducing the absorption capacity of the material.

There are other technologies that can be used for the absorption or removal of apolar compounds from natural areas that have been degraded by accidents involving the spilling or leaking of petroleum, solvents, oils or similar substances. For instance, one can cite the use of bird feathers for absorption (BR0005023, "A method and device for holding and absorbing petroleum, derivatives thereof, oils of animal or vegetable origin and other hydrocarbons that are insoluble in water, on aquatic surfaces or in natural soils, and for filtration", 2002), or the use of digestive enzymes for decomposition of petroleum (U.S. Pat. No. 4,689,297, "Dust free particulate enzyme formulation", 1985).

The technologies described in the above-cited documents present variable that may render their implementation unfeasible, chiefly in the face of large amounts of petroleum to be absorbed, as is the case with the sinking of oil extraction platforms or cargo ships, the bursting of oil pipelines caused, for instance, by earthquakes, terrorist attacks and explosions.

Thus, the present invention was also developed to comply with urgent demands for petroleum (oil) absorption processes as well as for decontamination of industrial wastes. However, the use of nonwoven fabric (TNT), an absorbent material with high chemical stability enables its use in rivers, lakes and lagoons, mangroves, artesian wells and water tanks, without delivering toxic compounds to the environment that is already damaged by contamination of apolar compounds. The high stability of the absorbent material in fixing the apolar component prevents it from returning to the aquatic medium, thus allowing same to be removed and carried for an appropriate industrial plant for collecting the apolar compound in situ, without the need of transportation with bulky materials that are not part for the recovered apolar components.

Additionally, the use of flexible fabric also allows the production of selective filters thus enabling the use of the absorbent material for a long time, with the advantage of obtaining the apolar component immediately after separation from the water phase, without chemical modification thereof. It is a considerable improvement when compared to the technology disclosed in PI1103680-8 according to which the construction of filters was still poor due to the low separation rate.

DETAILED DESCRIPTION OF THE INVENTION

Figure 1:
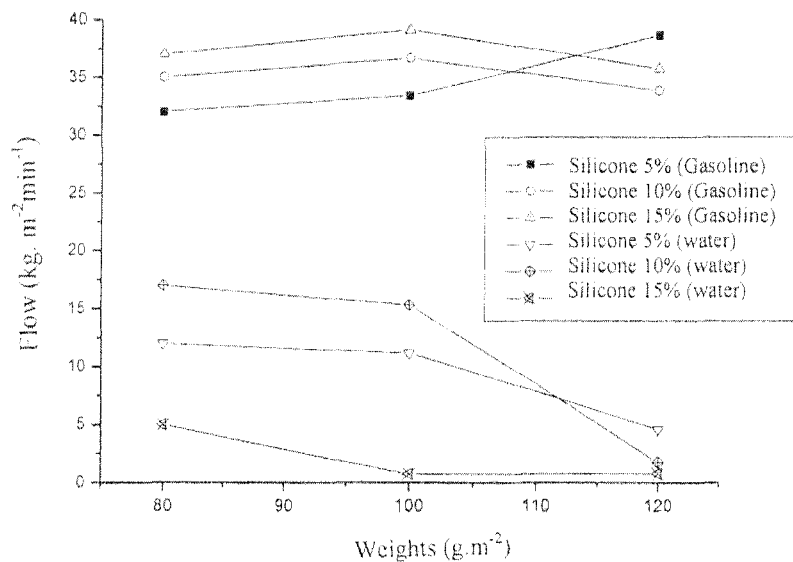
FIG. 1 shows the water and petroleum rate for absorbent TNT material with 80, 100 and 120 g·m² rendered waterproof with 5, 10 and 15% silicon solutions.

The present invention describes a process for preparing and using an absorbent material for apolar compounds or mixtures thereof that consists of fixing a compound having high affinity for apolar substances on a fabric, preferably non-woven fabric (TNT), matrix.

The TNT matrix is a fabric produced by pressing of random fibers made of cotton, rayon and/or polyester. The TNT support matrix can be replaced by type flannel fabrics, polyester and elastane (spandex) fabric or mixtures of these types of fabric. The hydrophobizing compound comprises liquid silicone, polystyrene, polyethylene terephthalate (PET), polyethylene or polypropylene. The silicone is used in adhesives, protective coatings, wetting agents, foam stabilizers, cosmetics and creams, while the other mentioned polymers may be obtained from waste materials, such as expanded polystyrene and packages.

In another aspect, a major advantage of the present technology relies on the fact that it allows the construction of devices such as filters, enabling the use of the absorbent material for a long period, with the advantage of obtaining the apolar component immediately after separation from the aqueous phase without chemical alteration thereof.

The preparation of the absorbent material of apolar compounds consists in dipping the fabric matrix in a solution of hydrophobizing agent. This solution can be silicone in ethyl ether with a concentration of 1 to 20% (v/v) or polystyrene and, in this case, firstly a solution of polystyrene in ethyl acetate is prepared at a concentration between 1 and 3 kg/L, then this solution is diluted to a range between 3 and 15% (v/v) in a mixture of 1:5 (v/v) ethyl acetate and ethyl ether. The water-proof materials prepared with silicone will be hereafter referred to as Class 1, whereas those prepared with polystyrene will hereafter be referred to as Class 2. The second step consists in fixing the hydrophobizing agent. For fixing silicone it is necessary to carry out the thermal treatment of the impregnated material in the interstices of the fabric matrix. The thermal treatment should be made at a temperature ranging from 30 to 100° C. for a period ranging from 15 to 240 minutes. During the thermal treatment, the silicone interacts with the fabric matrix, fixing it irreversibly. For fixing the polystyrene the fabric matrix must be exposed to air or heated at a temperature of 40° C. for 60 to 240 minutes.

During the hydrophobizing agent fixing step, the solvents used in solubilizing the silicone or polystyrene can be collected with the aid of a condenser, enabling it to be reused in new impregnating processes.

The absorbent material may be applied in processes of decontamination of effluents that contain homogeneous contaminants, but with apolar characteristics, or contaminants that are immiscible in water and that are on the surface of the aquatic systems, as for example, petroleum, lubricant oils, oils for preparing foods, industrial solvents such as toluene, benzene, hexane, cyclohexane and derivatives of these solvents.

The high interaction of the absorbent material with apolar compounds enable it to be used for decontaminating artesian wells or cisterns contaminated with leaching of components that are partly miscible (partially apolar) by rainfalls or by the agricultural irrigation processes.

The absorbent material is in the form of a flat sheet with weights in the range of 50 to 200 g·m², which allows the production of devices such as filters, either by continuous or batch processes. The resulting material may be used for selective passage of apolar components, preventing the aqueous phase from passing through it. Thus, by putting a heterogenous mixture of two or more apolar components, emulsified or not, in contact with the absorbent material of the invention, the apolar components will permeate the hydrophobic porous of the fabric. The use of the absorbent material according to the present invention does not need a regeneration step as disclosed in PI1005885-0, since even when impregnated both with the apolar material the waterproof material maintain the selective properties between the aqueous phase and the apolar phase.

In view of the selective properties of the absorbent material of the present invention it is possible to use in decontamination of environments containing high amounts of apolar substances, as for example in spillage of petroleum in oceans, seas, lakes, lagoons, bays, rivers, leak of oil pipelines in rivers, mangroves, lagoons and lakes In the case of spillage of petroleum the present technology provides an additional advantage since it is easier than the already existing processes for removing the oil from the damaged areas. The total or partial removal of oil from areas wherein that has been spillage of petroleum is carried out by pumping the mixture of oil an water, which is transported to tanks or ships wherein, after a separation process the aqueous phase may be delivered to the environment. According to the present invention, a filters system may be prepared where the apolar material is transported to the storage system and simultaneously the aqueous phase is carried to the environment with a purification rate greater than 95%.

The technology may be better understood with reference to the analysis of the following examples, which are not limitative.

Example 1: Preparation of the Class 1 Absorbent Material (Silicone)

In order to carry out the absorption tests of this invention, 1 m² of fabric with weights of 80, 100 and 120 g·m² was used. Silicone solutions of 5, 10 and 15% (v/v) in ethyl ether were also prepared. The fabric was dipped into the solution for 1 to 5 minutes and then dried in a muffle at 100° C. for 1 hour.

Example 2: Use of the Class 1 Absorbent Material for Absorbing Petroleum (Oil)

Each of the absorbent material composition was subjected to flow tests and thermal stability tests. The flow tests were conducted using glass straight tubes with an internal diameter of 1.5 cm, and wherein at the end of the tube a piece of absorbent material was fixed so that it can be used as a filter. After addition of 10 g of oil or water the time it could for the component to pass the fabric was measured and the amount of the permeated material was evaluated using a scale. Each flow test was performed in triplicate. The flow data (g·m$^{-2}$·min$^{-1}$) and efficiency of separation compared to the same volume of distilled water are given in FIG. 1. The flow rates for the oil were in a range between 35 and 40 kg·m$^{-2}$·min$^{-1}$, whereas the maximum water flow was 2 kg·m$^{-2}$·min$^{-1}$.

Figure 2:
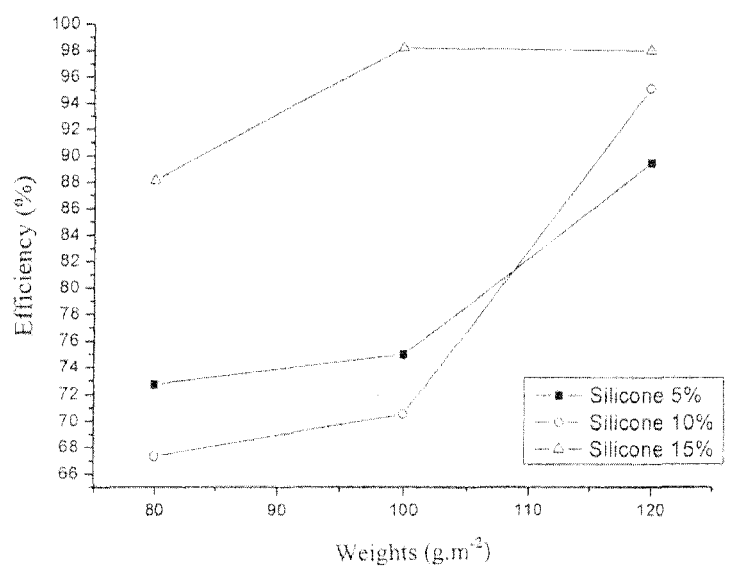
FIG. 2 shows a graph of separation efficiency of the oil and water for absorbent material with TNT weights 80, 100 and 120 g·m² rendered water-proof with 5, 10 and 15% silicone solutions.
Figure 3A:
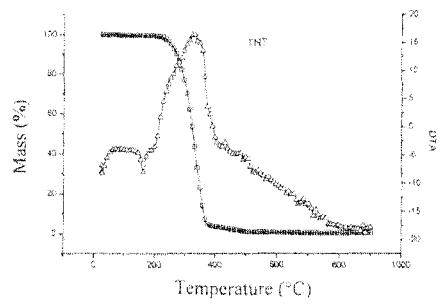
FIGS. 3A-3D show graphs of thermogravimetric analysis (TG and DTA) for non-woven fabric (TNT) and TNT rendered water-proof with silicone solution of 5, 10 and 15% (v/v).
Figure 3B:
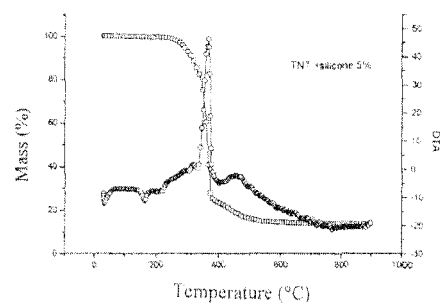
Figure 3C:
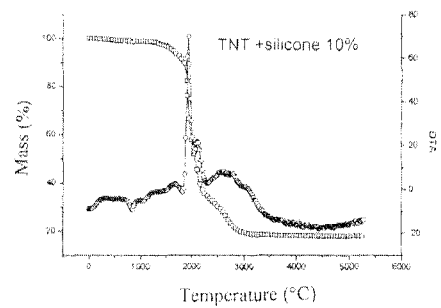
Figure 3D:
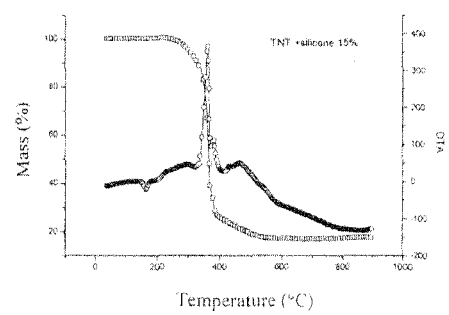

The efficiency of the separation process can be evaluated by the ratio between the flows of oil and water, as is shown in FIG. 2, where the material having weight of 120 g·m² presents more efficiency in the separation process for mixtures of oil and water. Thermally, pure TNT starts the degradation process at 165° C. (FIG. 3) which is completed at 410° C., with the addition of silicone initial temperature of degradation of TNT phase was in the range of 220 and 410° C. The addition of silicone increases the thermal stability of TNT in about 50° C., thereby increasing the durability the absorbent material.

Example 3: Use of the Class 1 Absorbent Material for Gasoline Absorption

Figure 4:
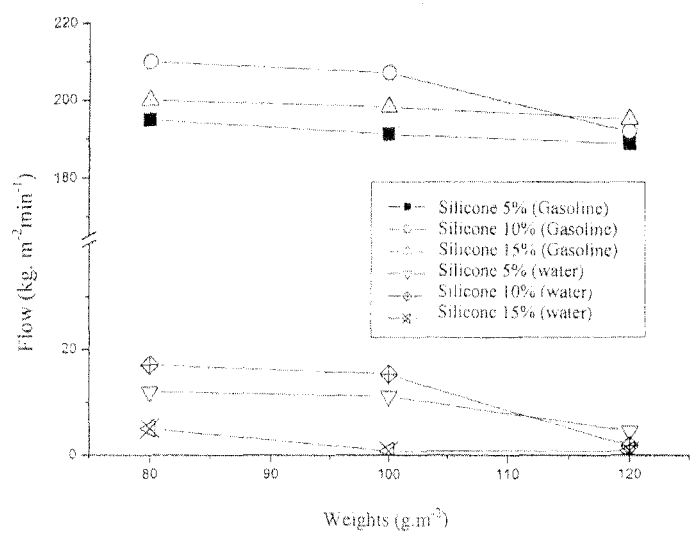
FIG. 4 shows the flow chart of gasoline and water for the absorbent material with TNT weights 80, 100 and 120 g·m² rendered water-proof with 5, 10 and 15% silicone solutions.

The flow tests for gasoline were conducted in similar way as the tests with petroleum (oil). Each flow test was performed in triplicate and the flow data (gm$^{-2}$·min$^{-1}$) and separation efficiency relative to the same volume of distilled water are shown in FIG. 4. Flow values for gasoline were in a range between 185 and 210 kg·m$^{-2}$·min$^{-1}$, while the maximum water flow was 15 kg·m$^{-2}$·min$^{-1}$ (FIG. 4).

Figure 5:
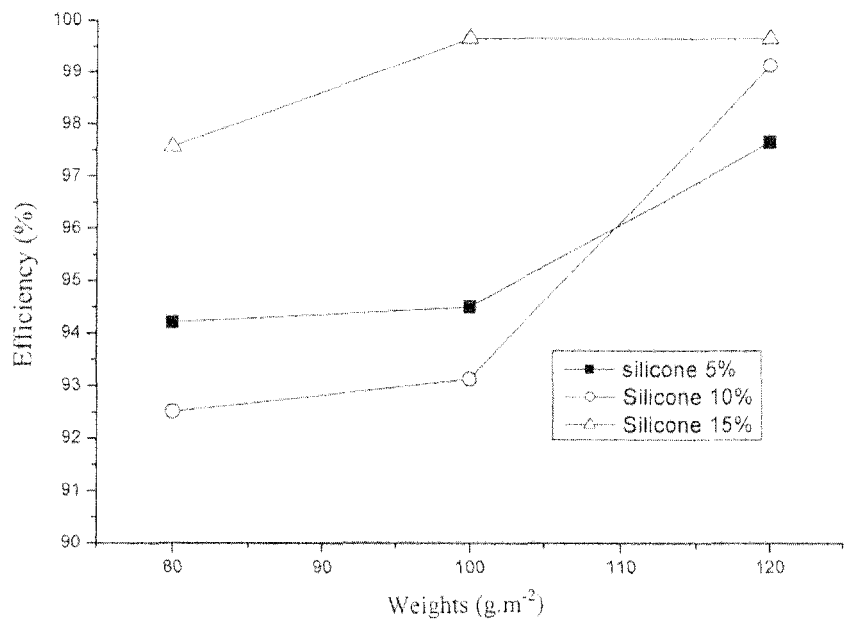
FIG. 5 shows a graph of efficiency of separation of the gasoline and water for the absorbent material with TNT weights 80, 100 and 120 g·m² rendered water-proof with 5, 10 and 15% silicone solutions.

The efficiency of the separation process can be evaluated by the ratio between the gas and water flows (FIG. 5), and due to high flow of gasoline it was obtained a minimum yield of 92% for TNT 80 with 10% silicone and a maximum yield of 99% for TNT 120 with 15% silicone.

Example 4: Preparation of the Class 2 Absorbent Material (Polystyrene)

In order to carry out the absorption tests, 1 m² of TNT fabric with weights of 80, 100 and 120 g·m² was used. For the preparation of the hydrophobizing agent a solution of polystyrene in ethyl acetate was used prepared from 1 kg of polystyrene and 500 mL of ethyl acetate. Then the solution was diluted to proportions of 3, 5 and 10% (v/v) to be utilized in the hydrophobization process with a mixture of 1:5 of solvent—ethyl acetate and ethyl ether. After impregnation of the solution into the fabric, it was left to rest for approximately 120 minutes at room temperature.

Example 5: Use of the Class 2 Absorbent Material for Absorbing Petroleum (Oil)

Figure 6:
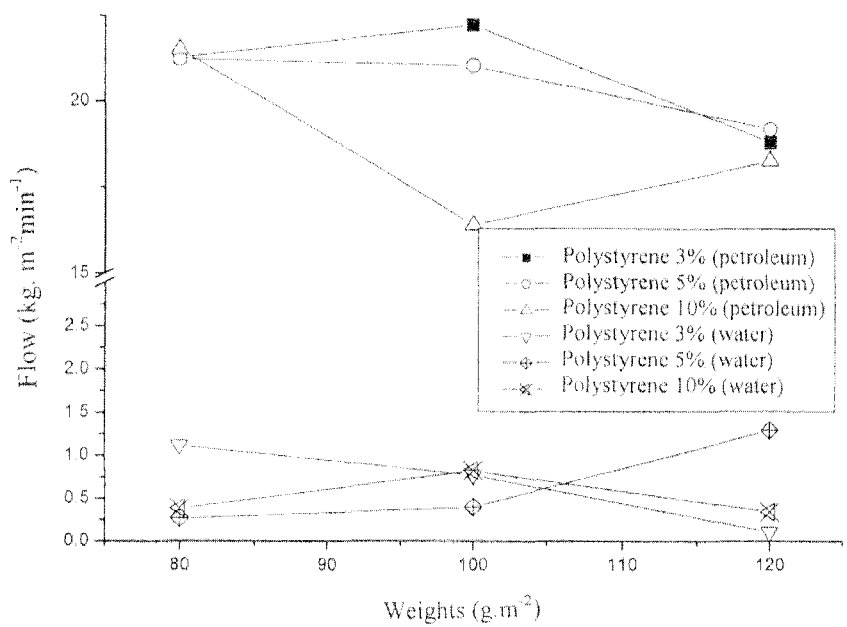
FIG. 6 shows the flow chart for the oil and water for the absorbent material with TNT weights 80, 100 and 120 g·m² rendered water-proof with 3, 5 and 10% polystyrene solutions.
Figure 7:
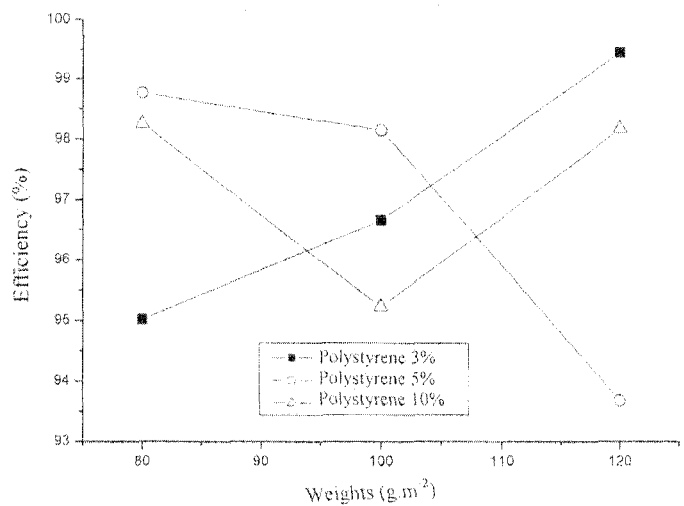
FIG. 7 shows a graph of efficiency of separation of oil and water mixture for the absorbent material with TNT weights 80, 100, 120 g·m² rendered water-proof with 3, 5 and 10% polystyrene solutions.
Figure 8A:
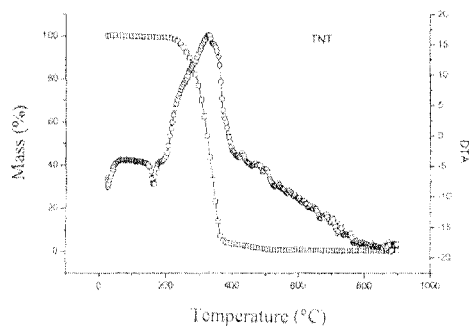
FIGS. 8A-8D show the graphs of thermogravimetric analysis (TG and DTA) for nonwoven fabric (TNT) and TNT rendered water-proof with 3, 5 and 10% polystyrene solutions (v/v).
Figure 8B:
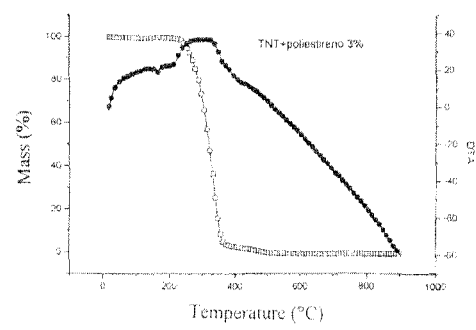
Figure 8C:
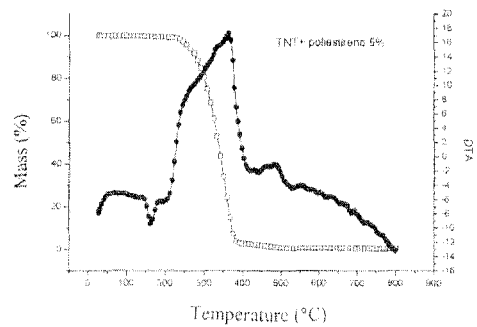
Figure 8D:
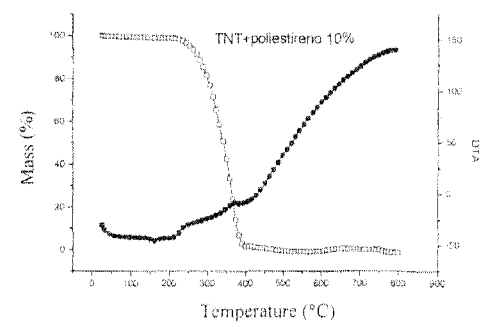

The flow tests for oil were performed in triplicate. The separation flow data (kg·m$^{-2}$·min$^{-1}$) compared to the same amount of distilled water are shown in FIG. 6. Flow values were in a range between 15 and 20 kg·m$^{-2}$·min$^{-1}$, whereas the maximum water flow was 1.5 kg·m$^{-2}$·min$^{-1}$ (FIG. 6). Although the flow of oil in the material hydrophobized with polystyrene is approximately half of the material hydrophobized with silicone, the water flow in that material corresponds to a maximum rate of 1.5 kg·m$^{-2}$·min$^{-1}$, ensuring that materials hydrophobized with polystyrene show high efficiency (<93%). The separation process using lower weights (80 and 100 gm$^{-2}$) are more efficient when hydrophobizing agent concentration is higher (10 and 5%). However for even higher weight (120 gm$^{-2}$) hydrophobization with 3% (v/v) polystyrene solution becomes more efficient; this inverse relationship may be economically useful for the construction of devices with lower cost without loss of efficiency. Thermally, pure TNT began the process of degradation at 165° C. (FIG. 8) which was completed at 410° C. with the addition of polystyrene; initial temperature of degradation of TNT phase was in the range between 205 and 410° C. The addition of polystyrene provided an increase in thermal stability of TNT in about 40° C., thereby increasing the absorbent material durability.

Example 6: Use of the Class 2 Absorbent Material for Gasoline Absorption

Figure 9:
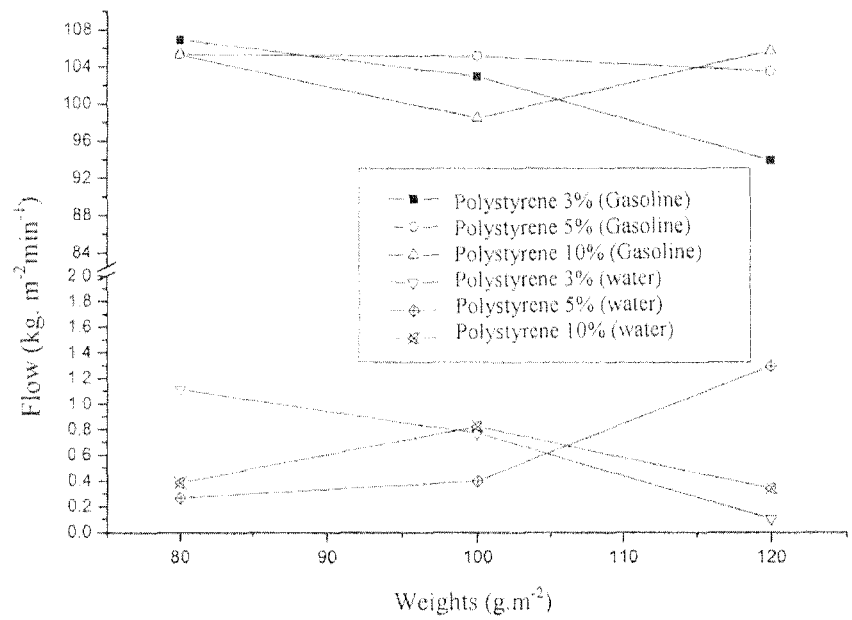
FIG. 9 shows the flow chart of gas and water for the absorbent material with TNT weights 80, 100 and 120 g·m² rendered water-proof with 3, 5 and 10% polystyrene solutions.

The flow tests for gasoline were conducted in similar way as the tests with petroleum (oil). Each flow test was performed in triplicate and the flow data (gm$^{-2}$·min$^{-1}$) and separation efficiency relative to the same volume of distilled water are shown in FIG. 9. Flow values for gasoline were in a range between 95 and 110 kg·m$^{-2}$·min$^{-1}$, while the maximum water flow was 1.1 kg·m$^{-2}$·min$^{-1}$ (FIG. 8).

Figure 10:
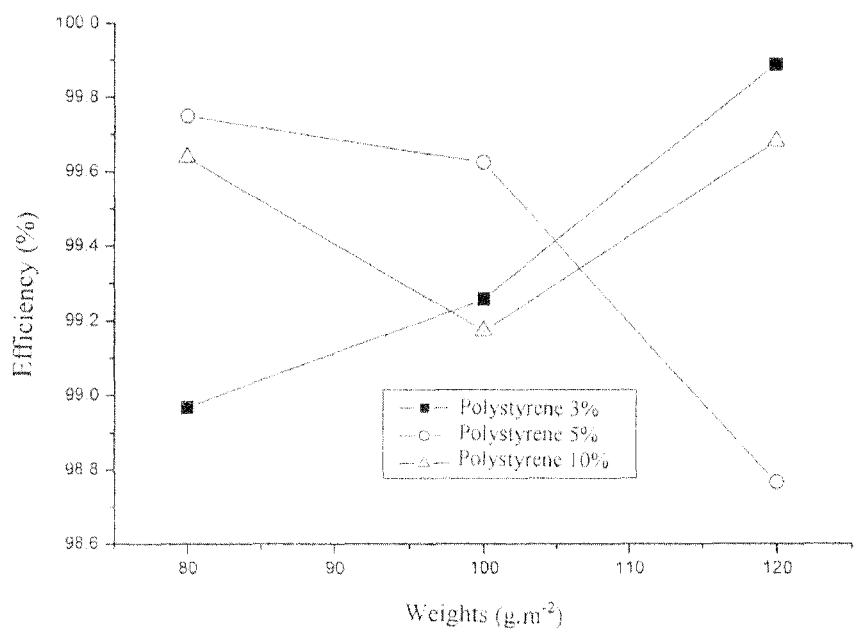
FIG. 10 shows a graph of efficiency of the separation process of fuel and water mixture for the absorbent material with TNT weights 80, 100 and 120 g·m² rendered waterproof with 3, 5 and 10% polystyrene solutions.

The efficiency of the separation process can be evaluated by the ratio between the gas and water flows as it is shown in FIG. 10, and due to high flow of gasoline it was obtained a minimum yield of 94% for TNT 80 with 3% polystyrene and a maximum yield of 99% for TNT 120 with 3% polystyrene.

Example 7: Preparation of the Class 2 Absorbent Material (Polystyrene) Using Fabrics of 92% Polyester and 8% Elastane The preparation of the hydrophobizing agent in this example employed a concentrated solution of polystyrene in ethyl acetate being 1 kg of Styrofoam dissolved in 500 mL of ethyl acetate. The preparation consists of using a part of the concentrated solution diluted to a concentration of 20% (v/v), for use in the hydrophobization process with ethyl acetate as solvent. After impregnation of the solution into the fabric, it is left to rest for approximately 120 minutes at room temperature. After the hydrophobization process qualitative tests were performed to investigate the effectiveness of hydrophobization process. For fabrics of the flannel type and elastane (spandex), the water flow is substantially reduced compared to normal fabric (without hydrophobization), while the passage of oil still occurs without loss of efficiency. This result indicates that these fabrics may also be used for construction of less selective filters. For the polyester fabric in the test composition (92% and 8%), passage of water is not observed, although the wet appearance of the fabric; on the other hand, passage of oil can be detected immediately at the instant it enters into contact with the fabric, keeping the oil(petroleum)-water separation characteristics.

The invention claimed is:

1. A process for preparing an absorbent material for apolar compounds or mixtures, characterized by comprising the following steps:
   a) impregnating a fabric matrix with a polymer-containing solution wherein the polymer-containing solution is (i) silicone in ethyl ether, wherein the silicone has a concentration ranging from 1% (v/v) to 20% (v/v), to obtain a polymer-impregnated fabric; or (ii) an other polymer selected from the group consisting of polystyrene, polyethylene terephthalate (PET), polyethylene, and polypropylene, in a mixture with a solution having 1:5 of ethyl acetate and ethyl ether, wherein an intermediary solution of polystyrene, polyethylene terephthalate (PET), polyethylene, or polypropylene in ethyl acetate at a concentration ranging from 1 kg/L to 3 kg/L of the another polymer is prepared and then mixed with said solution having 1:5 of ethyl acetate and ethyl ether to obtain an other polymer-impregnated fabric; and
   b) fixing said polymer-impregnated fabric by (i) thermal treatment of the silicone-impregnated fabric at a temperature ranging from 30° C. to 100° C. for a period ranging from 60 minutes to 240 minutes or (ii) drying said other polymer-impregnated fabric in open air or (iii) heating said other polymer-impregnated fabric at a temperature of 40° C. for 60 minutes to 240 minutes to obtain said absorbent material.

2. The process for preparing an absorbent material for apolar compounds or mixtures according to claim 1, characterized in that the fabric matrix used in step (a) is selected from the group consisting of nonwoven TNT fabric, flannel type fabrics, polyester, and elastane (spandex) fabric or mixtures thereof.

3. The process for preparing an absorbent material for apolar compounds or mixtures according to claim 1, characterized in that the fabric matrix used in step (a) has a weight between 50 $g \cdot m^2$ and 200 $g \cdot m^2$.

4. The process for preparing an absorbent material for apolar compounds or mixtures according to claim 1, characterized in that the absorbent material absorbs one or more organic compounds selected from the group consisting of phenol, toluene, benzene, hexane, and cyclohexane or absorbs one or more apolar mixtures selected from the group consisting of petroleum, lubricant oils, and edible oils.

5. The process for preparing an absorbent material for apolar compounds or mixtures according to claim 1, characterized in that the absorbent material absorbs large amounts of one or more apolar substances in the environment.

6. The process for preparing an absorbent material for apolar compounds or mixtures according to claim 1, characterized in that the fabric matrix is impregnated with a solution of polystyrene in a mixture containing 1:5 of ethyl acetate and ethyl ether in a ratio of 1:5 to 1:0.

* * * * *